United States Patent
Davies

(10) Patent No.: US 11,231,089 B2
(45) Date of Patent: Jan. 25, 2022

(54) EPICYCLIC GEAR SYSTEM

(71) Applicant: Goodrich Actuation Systems Limited, Solihull (GB)

(72) Inventor: Stephen Davies, Shrewsbury (GB)

(73) Assignee: GOODRICH ACTUATION SYSTEMS LIMITED, Solihull (GB)

(*) Notice: Subject to any disclaimer, the term of this patent is extended or adjusted under 35 U.S.C. 154(b) by 27 days.

(21) Appl. No.: 16/718,248

(22) Filed: Dec. 18, 2019

(65) Prior Publication Data

US 2020/0240491 A1    Jul. 30, 2020

(30) Foreign Application Priority Data

Jan. 28, 2019   (EP) .................................... 19275012

(51) Int. Cl.
  *F16H 57/08*   (2006.01)
  *F16H 1/28*    (2006.01)

(52) U.S. Cl.
  CPC ......... *F16H 1/2863* (2013.01); *F16H 57/082* (2013.01)

(58) Field of Classification Search
  CPC .............................. F16H 1/2863; F16H 57/082
  USPC ......................................... 475/331, 346, 347
  See application file for complete search history.

(56) References Cited

U.S. PATENT DOCUMENTS

| | | | |
|---|---|---|---|
| 7,121,973 B2 | 10/2006 | Lumpkin et al. | |
| 8,961,346 B2* | 2/2015 | Murakami | F16H 45/02 475/71 |
| 9,334,928 B2 | 5/2016 | Ko et al. | |
| 9,366,317 B2 | 6/2016 | Croce et al. | |
| 2013/0184120 A1* | 7/2013 | Altamura | F16H 1/28 475/346 |
| 2017/0227114 A1* | 8/2017 | Brevick | F16H 1/28 |

FOREIGN PATENT DOCUMENTS

| | | |
|---|---|---|
| DE | 102008039942 A1 | 3/2010 |
| EP | 3076045 A1 | 10/2016 |
| JP | H0238551 U | 3/1990 |
| JP | H0348045 A | 3/1991 |
| WO | 2013083188 A1 | 6/2013 |

OTHER PUBLICATIONS

English translation of JPH0348045A; http://translationportal.epo.org; Feb. 10, 2021 (Year: 2021).*
European Search Report for Application No. 19275012.3, dated Jul. 9, 2019, 8 pages.

* cited by examiner

*Primary Examiner* — Roger L Pang
(74) *Attorney, Agent, or Firm* — Cantor Colburn LLP

(57) ABSTRACT

An epicyclic gear system having an epicyclic gear stage that includes a sun gear; a carrier, wherein the carrier comprises a plurality of planet gear axles; a plurality of planet gears, each planet gear being located on one of the planet gear axles; a ring gear. The stage also includes an output shaft, wherein the output shaft is connected to the carrier via a biasing mechanism positioned between the carrier and the output shaft, the biasing mechanism being configured to urge the carrier and the output shaft away from one another.

16 Claims, 3 Drawing Sheets

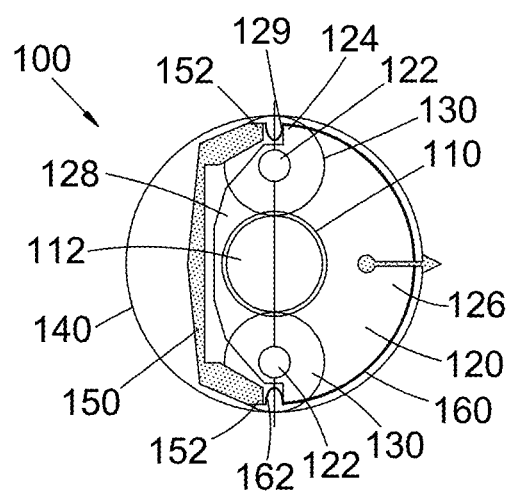
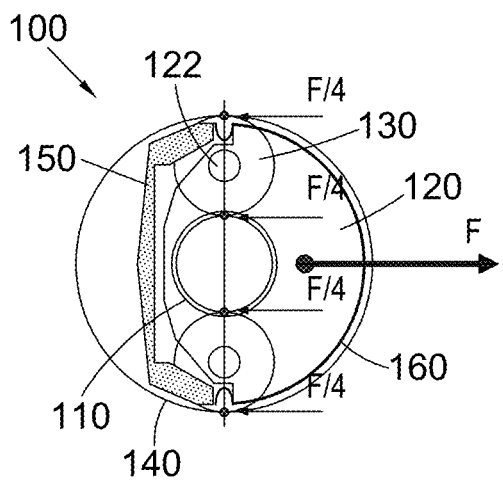
Fig. 2  Fig. 3
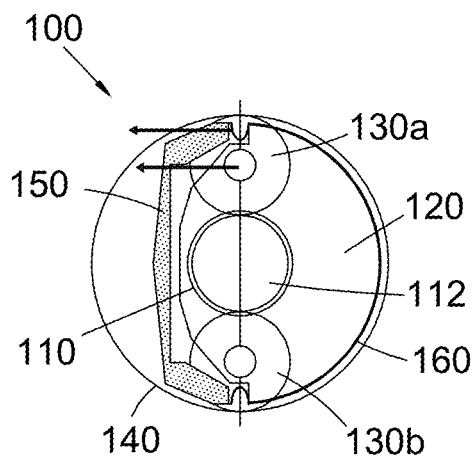
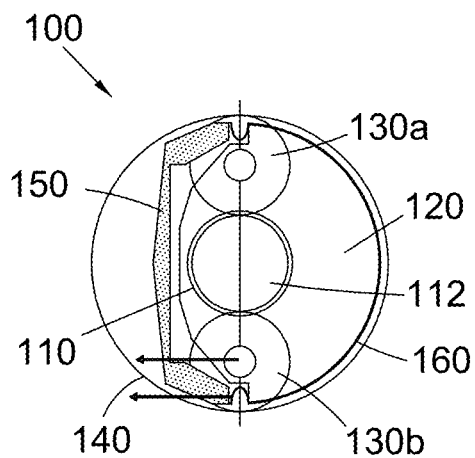
Fig. 4  Fig. 5

EPICYCLIC GEAR SYSTEM

FOREIGN PRIORITY

This application claims priority to European Patent Application No. 19275012.3 filed Jan. 28, 2019, the entire contents of which is incorporated herein by reference.

TECHNICAL FIELD

The present invention relates to epicyclic gear systems, and more particularly, to the reduction of backlash in gear systems.

BACKGROUND

Backlash is the clearance or space that exists between parts that do not fit together seamlessly. In the example of gear systems, backlash may occur between sets of gear teeth. This can have the effect of creating a delay between one gear rotating and that one gear causing another gear to begin to rotate. In systems concerned with positional accuracy, backlash can lead to inaccurate positional measurements, which can then lead to inaccurate operation of instruments.

An epicyclic gear stage typically comprises a sun gear which receives an input torque, two or more planet gears which are intermeshed with and revolve around the sun gear, receiving torque therefrom, and a carrier. The carrier generally has two functions: carrying the planet gears as they revolve collectively around the sun gear and transferring the torque received from the revolving movement to an output shaft. The planet gears are free to rotate around their axes within the carrier, but the circular movement of their axes around the sun gear drives the rotary movement of the carrier. The planet gears are typically further intermeshed and contained within a ring gear which may be fixed or may also be able to rotate.

Multi-stage epicyclic gearboxes are commonly used to provide a high-ratio reduction from a rotational input to a rotating position transducer. In such position sensing systems, the backlash within the gearbox typically dictates the positional accuracy of the sensor. In a multi-stage epicyclic gearbox, the contribution of backlash in the limiting of sensor accuracy is highest at the stage closest to the gearbox output. In a four-stage gearbox, for example, the contribution of backlash per stage in governing sensor accuracy is typically 0.5%, 5%, 22%, and 100% as percentage contribution compared to stage four. Hence, even if backlash can only be eliminated in the fourth stage, a significant proportion of the overall effect of backlash on positional sensor accuracy can be reduced.

SUMMARY

Viewed from a first aspect, the invention provides an epicyclic gear system having an epicyclic gear stage, the epicyclic gear stage comprising: a sun gear; a carrier, wherein the carrier comprises a plurality of planet gear axles; a plurality of planet gears, each planet gear being located on one of the planet gear axles; a ring gear; and an output shaft, wherein the output shaft is connected to the carrier via a biasing mechanism positioned between the carrier and the output shaft, the biasing mechanism being configured to urge the carrier and the output shaft away from one another.

Existing epicyclic gear stages may have methods of backlash reduction that are bulky, heavy or complex, which can lead to difficulties satisfying installation envelope constraints.

The gear system of the first aspect achieves backlash reduction in an epicyclic gear stage by biasing the carrier and an output shaft away from one another. This may be done using a force having a major component or entirely in a plane normal to an axis aligned through the centre of the sun gear and bisecting the centres of the planet gears. There may be a plurality of planetary gears and at least two planetary gears may be disposed opposite one another across the sun gear and proximate to the biasing mechanism acting on the carrier. The biasing mechanism urges the carrier such that the force of the biasing mechanism is reacted by the engagements between each of the planetary gears and the ring gear and between each of the planetary gears and the sun gear. In other words, the carrier is preloaded against the output shaft and the force from the biasing mechanism is such that the carrier and output shaft are in equilibrium.

The simplest system to which this can be applied is an epicyclic gear stage with two planet gears disposed opposite one another across the sun gear. There may be epicyclic gear stages to which this invention may be applied that only have two planet gears. When a rotational input is provided from the sun gear, the sun gear will act to rotate whichever planet gear directly reacts to the direction of input, either clockwise or anti-clockwise. This then causes the carrier to rotate and thus cause the output shaft to rotate due to the carrier acting on the output shaft through the biasing mechanism. A rotational input of the opposite direction will act to rotate the other planet gear that did not previously directly react to the first direction of input, and therefore the carrier and the output shaft will rotate in the opposite direction. In either case, in this example of an epicyclic gear stage having two planet gears, only one planet gear is directly driven in any given direction while the opposite planet gear effectively free-wheels due to tooth backlash.

An advantage of the present invention is that backlash in an epicyclic gear stage is eliminated using a biasing mechanism, resulting in the order of an 80% reduction in the overall backlash of a typical four stage epicyclic reduction gearbox into a rotary sensor.

The biasing mechanism of the first aspect may comprise compressive springs, leaf springs, elastic material, or any other suitable biasing means.

The carrier of the first aspect may be shaped roughly in a semi-circular shape, wherein the carrier may have two planet gear axles positioned proximate to the vertices of the semi-circular shape and the main curve of the shape following the curve of the ring gear. The carrier may comprise one member for holding the planet gears or it may comprise two members such that the planet gears are disposed between the carrier members. A configuration having multiple carrier members may have an advantage of providing increased stability to the planet gears and a more equal load distribution across the teeth of the planet gears in response to input from the sun gear. There may be a bulge in the straight portion of the semi-circular shape so that the carrier can fully accommodate the planet gear axles and, in the case of a carrier having multiple carrier members, to allow the sun gear to extend through the carriers via a carrier member hole. The output shaft may be shaped to extend through the ring gear and adjacent to the carrier so that the output shaft is within the space in the ring gear unoccupied by the semi-circular shape of the carrier. The output shaft may also have a semi-circular shape, a crescent moon shape or any other shape suitable to complement the shape of the carrier. Compressive springs may be disposed proximate to the vertices of the semi-circular shape of the carrier to connect the carrier to the output shaft.

The epicyclic gear system of the first aspect may be used in a positional sensor system. In such systems, there is a need to minimise backlash in order to ensure the accuracy of the sensor. A positional sensor system may utilise a transducer having a limited effective range of rotation. That is to say, the positional sensor system may have a rotational transducer that operates within a specific angular range, such angular range having an extent less than 360°. In such systems, the rotation of the output shaft leads to the rotation of the transducer. The transducer may be attached or connected to or integrated within the output shaft of the epicyclic gear system. In positional sensor systems having limited angular range, a multi-stage gearbox may be required to provide a high ratio reduction between an input and the output. This may be achieved with any number of gear stages. An example of such a system is in an aircraft having a motor operating an aileron and having a rotational displacement of 300 revolutions that is connected to a positional sensing system. A high ratio or high displacement reduction gear stage would need to be provided between the motor and the position sensing transducer due to the limited range in which the transducer may operate. The skilled person would be able to select a transducer appropriate to the overall system in which the sensor operates.

An advantage of using the present invention in a positional sensor system is a reduction or elimination of backlash in the sensor system, meaning that the output shaft comprising or connected to a transducer is able to more accurately communicate rotational inputs, particularly if the direction of rotation changes.

The epicyclic gear system of the present invention may alternatively be used within a gearbox for low-powered applications, such as in 3D printing machines. The springs of the present invention would typically be limited by the amount of force applied to the springs and their spring constant to determine whether the springs would still be able to perform their function of biasing the carrier and output shaft away from one another under high loads. In high-powered applications, the load placed upon said springs may be such that they are unable to reduce backlash in an epicyclic gear stage.

An advantage of using the present invention in a gearbox for a low-powered apparatus is increased precision in the driving system. In the example of a 3D printer, reduced backlash in the gearbox allows for an output that may detect changes in the rotational direction to a greater precision, meaning the 3D printer is able to print with increased accuracy.

The epicyclic gear system may use simple planet gears or compound planet gears. Compound gear structures may comprise structures such as meshed-planet, stepped-planet or multi-stage structures.

The angle of the teeth of any of the gears used in the inventive epicyclic gear system may be parallel to the axis aligned through the centre of the sun gear or they may be angled off of this axis.

Viewed from a second aspect, the invention provides a method for reducing backlash in an epicyclic gear system having an epicyclic gear stage, the epicyclic gear stage comprising: a sun gear; a carrier, wherein the carrier comprises a plurality of planet gear axles; a plurality of planet gears, each planet gear being located on one of the planet gear axles; a ring gear; and an output shaft, the method comprising: urging the carrier and the output shaft away from one another.

The epicyclic gear system of the second aspect may comprise any of the features of the first aspect of the invention.

BRIEF DESCRIPTION OF THE FIGURES

FIG. 2 illustrates an embodiment of the invention viewed face-on to the gear stage.

FIG. 3 illustrates force components acting upon an embodiment of the invention.

FIG. 4 illustrates the effects of rotating the sun gear of an embodiment in the anti-clockwise direction.

FIG. 5 illustrates the effects of rotating the sun gear of an embodiment in the clockwise direction.

DETAILED DESCRIPTION

Figure 1:
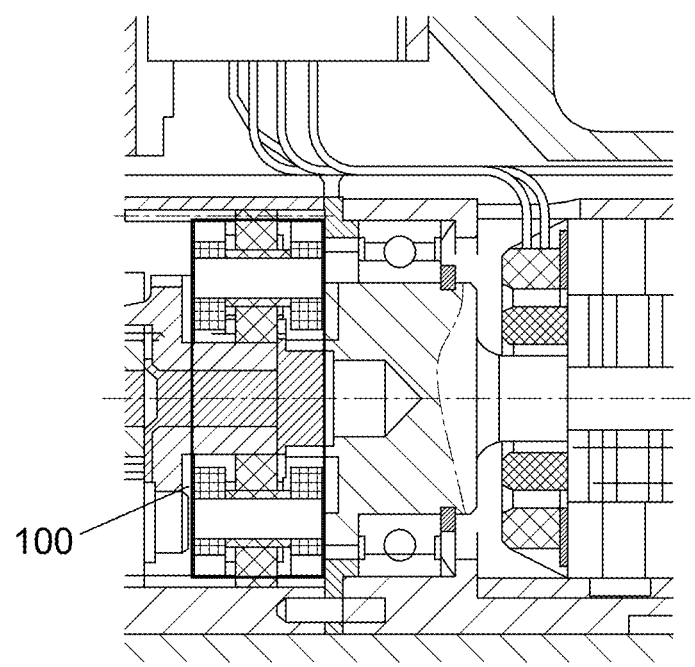
FIG. 1 illustrates an embodiment of the invention viewed from a direction orthogonal to the gear stage.

FIG. 1 shows a portion of an exemplary epicyclic gear system 1 comprising an epicyclic gear stage 100. FIG. 2 views the epicyclic gear stage 100 from FIG. 1 face-on and as a schematic.

The epicyclic gear stage 100 comprises a sun gear 110, a carrier 120, two planet gears 130, a ring gear 140, and an output shaft 150. The carrier 120 has two planet gear axles 122 extending into the carrier 120 and having the planet gears 130 mounted thereon, one planet gear 130 for each planet gear axle 122. The planet gears 130 have gear teeth (not shown) that engage with corresponding gear teeth on the sun gear 110 and on the ring gear 140. Due to manufacturing methods and tolerances on the machining of the gear teeth of each gear, engaging gear teeth do not fit together perfectly and so gaps are formed between engaged gear teeth (not shown), creating backlash in the epicyclic gear stage 100.

The planet gear axles 122 are positioned on the carrier 120 such that they are axially opposite one another across the sun gear 110.

The output shaft 150 and the carrier interact with one another through a biasing mechanism 160. In this embodiment, the biasing mechanism 160 is a leaf spring. The leaf spring 160 has spring elements 162 disposed at each end of the leaf spring 160 and in two locations between the output shaft 150 and the carrier 120. The spring elements 162 urge the carrier 120 and the output shaft 160 away from one another in directions substantially in the same plane as the epicyclic gear stage 100. This force is shown by the arrows near to each spring element in FIG. 2. The urging of the leaf spring 160 urges the carrier to one side of the epicyclic gear stage 100 in a direction away from the output shaft 150, which, in turn, moves the planet gear axles 122 and, therefore, the planet gears 130 in the same direction as the carrier 120. This has the effect of forcing the gear teeth of the planet gears 130 to engage fully with the sun gear 110 and the ring gear 140 and without a gap or backlash between engaged gear teeth. The skilled person will appreciate that the same technical effect achieved by the leaf spring 160 can be achieved through other means.

The carrier 120 is shaped roughly in a semi-circular shape. The two planet gear axles 122 are positioned proximate to the vertices 124 of the semi-circular shape and the main curve 126 of the shape follows the curve of the ring gear 140. Also proximate the vertices 124 of the carrier are lips 129. A lip 129 forms a surface on which the spring element 162 of the leaf spring 160 contacts the carrier 120. There is a bulge 128 in the straight portion of the semi-circular shape, the bulge 128 protruding outwards and radially towards the output shaft 150 from a point radially inward of the vertices 124 and the lips 129 of the carrier 120 such that the spring elements 162 of the leaf spring 160 are fully accommodated by the lips 129. The bulge 128 allows the carrier 120 to fully accommodate the planet gear axles 122 within the extent of the carrier. The bulge may also extend around a central shaft 112 connected to the sun gear 110.

The output shaft 150 is shaped to extend within the ring gear 140 and is adjacent to the carrier 120 so that the output shaft 150 is within a space in the ring gear 140 unoccupied by the carrier 120. The output shaft 150 also has a semi-circular shape, though the skilled person will appreciate that the shape of the output shaft 150 may be any shape that fits within the ring gear 140 without interfering with its operation and complements the shape of the carrier. Such shapes may include a crescent moon shape or any other shape suitable. The output shaft 150 has two ends 152 positioned at approximately opposite sides across the central shaft 112. The ends 152 are in contact with the spring elements 162 of the leaf spring 160 and, therefore, the output shaft 150 is connected to the carrier 120 via the spring elements 162.

The direction of the biasing force F from the leaf spring 160 acting upon the carrier 120 is illustrated in FIG. 3. The carrier 120 experiences an urging force F from the leaf spring 160 in the direction away from the output shaft 150. As the planet gears 130 are connected to the planet gear axles 122 which, in turn, are connected to the carrier 120, the planet gears 130 are also urged in a direction away from the output shaft 150. The planet gears 130 have gear teeth (not shown) that engage with the ring gear 140 and the sun gear 110. The urging force F has at least a major component in a plane normal to an axis aligned through the centre of the sun gear 110 and bisecting the centres of the planet gears 130.

Typically, due to imperfect machining methods, the gear teeth of engaging gears do not fit together perfectly. Instead, a gap typically exists between engaging gear teeth. When one gear is driven to rotate, there may be some delay between the driven gear starting to rotate and the teeth of the driven gear causing a second engaged gear to rotate due to this gap.

The urging force F causes the gear teeth of the planet gears 130 to engage with the gear teeth on the ring gear 140 and the sun gear 110 on one side of the gear teeth. In other words, at the point where the gear teeth of a planet gear 130 and the ring gear 140 engage, the gear teeth of the planet gears 130 are forced against the gear teeth of the ring gear 140 and the sun gear 110. At each of these points, a quarter of the urging force F reacts to the planet gears 130 such that the planet gears 130 do not rotate and the gear stage 100 is stationary.

FIG. 4 illustrates effects of rotating the sun gear 110 in the anti-clockwise direction. The terms "clockwise" and "anti-clockwise" are defined with respect to the gear stage 100 as viewed in the figures about the central shaft 112. Rotating the sun gear 110 in this direction causes the planet gears 130 to rotate in the clockwise direction which, in turn, causes the carrier 120 and the output shaft 150 to rotate in the anti-clockwise direction. In the gear stage 100 shown in FIG. 4, the planet gears 130 may be labelled as an upper planet gear 130a and a lower planet gear 130b, for ease of reference.

When the sun gear 110 begins to rotate anti-clockwise, the gear teeth of the sun gear 110 are fully engaged with the gear teeth of the upper plant gear 130a in the anti-clockwise direction. Therefore, there is no delay between the sun gear 110 beginning to rotate and the upper planet gear 130a beginning to rotate. Due to the urging force F, the gear teeth of the upper planet gear 130a are also fully engaged with the gear teeth of the ring gear 140 in the clockwise direction. When the upper planet gear 130a begins to rotate in the clockwise direction in response to the sun gear 110 rotating in the anti-clockwise direction, there is no gap between the gear teeth of the upper planet gear 130a and the ring gear 140 in the clockwise direction and so the upper planet gear 130a does not experience a delay between rotation and engagement with the ring gear 140. Therefore, there is no delay between the sun gear beginning to rotate and the carrier 120 being forced to rotate due to the upper planet gear 130a moving anti-clockwise. In turn, there is then no delay between the sun gear 110 beginning to rotate and the output shaft 150 being caused to rotate and so backlash has been eliminated from the gear stage in the anti-clockwise direction.

When the sun gear 110 begins to rotate anti-clockwise, the gear teeth of the sun gear 110 are not fully engaged with the gear teeth of the lower plant gear 130b in the anti-clockwise direction. However, due to the urging force F of the leaf spring 160, the gear teeth of the sun gear 110 remain engaged with the gear teeth of the lower planet gear 130b in the clockwise direction. Also due to the urging force F, the gear teeth of the lower planet gear 130b are engaged with the gear teeth of the ring gear 140 in the anti-clockwise direction.

FIG. 5 illustrates effects of rotating the sun gear 110 in the clockwise direction. Rotating the sun gear 110 in this direction causes the planet gears 130 to rotate in the anti-clockwise direction which, in turn, causes the carrier 120 and the output shaft 150 to rotate in the clockwise direction.

When the sun gear 110 begins to rotate clockwise, the gear teeth of the sun gear 110 are fully engaged with the gear teeth of the lower plant gear 130b in the clockwise direction. Therefore, there is no delay between the sun gear 110 beginning to rotate and the lower planet gear 130b beginning to rotate. Due to the urging force F, the gear teeth of the lower planet gear 130b are also fully engaged with the gear teeth of the ring gear 140 in the anti-clockwise direction. When the lower planet gear 130b begins to rotate in the anti-clockwise direction in response to the sun gear 110 rotating in the clockwise direction, there is no gap between the gear teeth of the lower planet gear 130b and the ring gear 140 in the anti-clockwise direction and so the lower planet gear 130b does not experience a delay between rotation and engagement with the ring gear 140. Therefore, there is no delay between the sun gear beginning to rotate and the carrier 120 being forced to rotate due to the lower planet gear 130b moving clockwise. In turn, there is then no delay between the sun gear 110 beginning to rotate and the output shaft 150 being caused to rotate and so backlash has been eliminated from the gear stage in the clockwise direction.

When the sun gear 110 begins to rotate clockwise, the gear teeth of the sun gear 110 are not fully engaged with the gear teeth of the upper plant gear 130a in the clockwise direction. However, due to the urging force F of the leaf spring 160, the gear teeth of the sun gear 110 remain engaged with the gear teeth of the upper planet gear 130a in the anti-clockwise direction. Also due to the urging force F, the gear teeth of the upper planet gear 130a are engaged with the gear teeth of the ring gear 140 in the clockwise direction.

Figure 6:
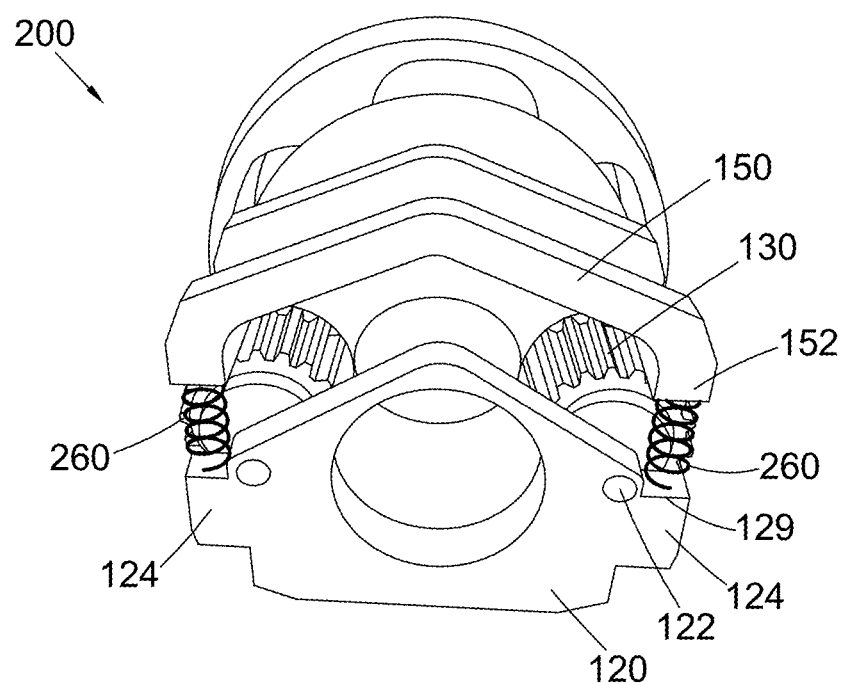
FIG. 6 illustrates an alternate embodiment of the invention in a three-dimensional view.

FIG. 6 illustrates a portion of alternate embodiment of the inventive gear stage 200 from a three-dimensional perspective. This embodiment differs from the previous embodiment in that the urging force F is provided by a set of compressed coil springs 260. These coil springs 260 are instead of the leaf spring 160 of the previous embodiment. The effect achieved by the coil springs 260 is the same as that of the leaf spring 160. That is to say, the carrier 120 experiences an urging force F from the coil springs 260 in the direction away from the output shaft 150. As the planet gears 130 are connected to the planet gear axles 122 which, in turn, are connected to the carrier 120, the planet gears 130 are also urged in a direction away from the output shaft 150. The urging of the planet gears 130 causes the gear teeth of the planet gears 130 to be physically urged against the gear teeth of the sun gear 110 (not shown in FIG. 6) and the ring gear 150 (not shown in FIG. 6). Therefore, the effects of rotating the sun gear 110 are the same as those described in relation to FIGS. 4 and 5 for a gear stage using a leaf spring 160.

The invention claimed is:

1. An epicyclic gear system having an epicyclic gear stage, the epicyclic gear stage comprising:
a sun gear;
a carrier, wherein the carrier comprises two planet gear axles;
a plurality of planet gears, each planet gear being located on one of the planet gear axles;
a ring gear; and
an output shaft, wherein the output shaft is connected to the carrier via a biasing mechanism positioned between the carrier and the output shaft, the biasing mechanism being configured to urge the carrier and the output shaft away from one another,
wherein the carrier is shaped in a semi-circular shape and a main curve of the semi-circular shape follows the curve of the ring gear, and wherein the two planet gear axles are positioned proximate to vertices of the semi-circular shape.

2. The epicyclic gear system of claim 1, wherein the carrier comprises two planet gear axles and the epicyclic gear stage comprises two planet gears.

3. The epicyclic gear system of claim 1, wherein the biasing mechanism comprises a plurality of springs.

4. The epicyclic gear system of claim 3, wherein the plurality of springs comprises a plurality of compressive springs or a plurality of leaf springs.

5. The epicyclic gear system of claim 1, wherein the carrier comprises one member for holding the planet gears.

6. The epicyclic gear system of claim 1, wherein the carrier comprises two members such that the planet gears are disposed between the carrier members.

7. The epicyclic gear system of claim 1, wherein the output shaft is shaped to extend through the ring gear and adjacent to the carrier so that the output shaft is within the space in the ring gear unoccupied by the carrier.

8. The epicyclic gear system of claim 1, wherein the biasing mechanism is disposed proximate to both vertices of the semi-circular shape of the carrier to connect the carrier to the output shaft.

9. The epicyclic gear system of claim 1, wherein the biasing mechanism urges the carrier and the output shaft away from one another by applying a force having a component in a plane normal to an axis aligned through a centre of the sun gear.

10. A positional sensor system comprising the epicyclic gear system of claim 1.

11. The positional sensor system of claim 10, wherein the output shaft is connected to or comprises a transducer.

12. A method for reducing backlash in an epicyclic gear system having an epicyclic gear stage, the epicyclic gear stage comprising:
a sun gear;
a carrier, wherein the carrier comprises two planet gear axles;
a plurality of planet gears, each planet gear being located on one of the planet gear axles;
a ring gear; and
an output shaft,
wherein the carrier is shaped in a semi-circular shape and a main curve of the semi-circular shape follows the curve of the ring gear, and wherein the two planet gear axles are positioned proximate to vertices of the semi-circular shape,
the method comprising:
urging the carrier and the output shaft away from one another using a biasing mechanism positioned between the carrier and the output shaft.

13. An epicyclic gear system having an epicyclic gear stage, the epicyclic gear stage comprising:
a sun gear;
a carrier, wherein the carrier comprises a plurality of planet gear axles;
a plurality of planet gears, each planet gear being located on one of the planet gear axles;
a ring gear; and
an output shaft, wherein the output shaft is connected to the carrier via a biasing mechanism positioned between the carrier and the output shaft, the biasing mechanism being configured to urge the carrier and the output shaft away from one another;
wherein the carrier is shaped in a semi-circular shape and a main curve of the semi-circular shape follows the curve of the ring gear, and wherein the biasing mechanism is disposed proximate to both vertices of the semi-circular shape of the carrier to connect the carrier to the output shaft.

14. A method for reducing backlash in an epicyclic gear system having an epicyclic gear stage, the epicyclic gear stage comprising:
a sun gear;
a carrier, wherein the carrier comprises a plurality of planet gear axles;
a plurality of planet gears, each planet gear being located on one of the planet gear axles;
a ring gear; and
an output shaft,
wherein the carrier is shaped in a semi-circular shape and a main curve of the semi-circular shape follows the curve of the ring gear, and wherein the biasing mechanism is disposed proximate to both vertices of the semi-circular shape of the carrier to connect the carrier to the output shaft,
the method comprising:
urging the carrier and the output shaft away from one another using a biasing mechanism positioned between the carrier and the output shaft.

15. An epicyclic gear system having an epicyclic gear stage, the epicyclic gear stage comprising:
a sun gear;
a carrier, wherein the carrier comprises a plurality of planet gear axles;
a plurality of planet gears, each planet gear being located on one of the planet gear axles;
a ring gear; and an output shaft, wherein the output shaft is connected to the carrier via a biasing mechanism positioned between the carrier and the output shaft, the biasing mechanism being configured to urge the carrier and the output shaft away from one another, wherein the carrier is shaped in a semi-circular shape and a main curve of the semi-circular shape follows the curve of the ring gear, and wherein the output shaft is shaped to extend through the ring gear and adjacent to the carrier so that the output shaft is within the space in the ring gear unoccupied by the carrier.

16. A method for reducing backlash in an epicyclic gear system having an epicyclic gear stage, the epicyclic gear stage comprising:

a sun gear;

a carrier, wherein the carrier comprises a plurality of planet gear axles;

a plurality of planet gears, each planet gear being located on one of the planet gear axles;

a ring gear; and an output shaft, wherein the carrier is shaped in a semi-circular shape and a main curve of the semi-circular shape follows the curve of the ring gear, and wherein the output shaft is shaped to extend through the ring gear and adjacent to the carrier so that the output shaft is within the space in the ring gear unoccupied by the carrier, the method comprising:

urging the carrier and the output shaft away from one another using a biasing mechanism positioned between the carrier and the output shaft.

* * * * *